(12) United States Patent
Burbrink et al.

(10) Patent No.: US 6,412,843 B1
(45) Date of Patent: Jul. 2, 2002

(54) COLLAPSIBLE SHOVEL

(75) Inventors: Philip Wade Burbrink, Columbus; Kevin Eugene Ackeret, Seymour; Trevor Scott Brown, Salem, all of IN (US)

(73) Assignee: Remco Products Corporation, Zionsville, IN (US)

( * ) Notice: Subject to any disclaimer, the term of this patent is extended or adjusted under 35 U.S.C. 154(b) by 0 days.

(21) Appl. No.: 09/837,832

(22) Filed: Apr. 18, 2001

(51) Int. Cl.⁷ .............................. A01B 1/22; B25G 1/04
(52) U.S. Cl. .................. 294/57; 403/108; 403/109.2
(58) Field of Search .................. 294/19.1, 49, 54.5, 294/57; 16/429; 403/104, 108, 109.1, 109.2, 109.6, 321, 322.1, 322.4, 326, 330, 377, 378, 379.2

(56) References Cited

U.S. PATENT DOCUMENTS

| | | | | |
|---|---|---|---|---|
| 1,263,131 A | * | 4/1918 | Seelye | 294/57 |
| 1,278,100 A | * | 9/1918 | Bruning | 294/57 X |
| 2,047,485 A | * | 7/1936 | McBrady | 294/57 |
| 4,406,559 A | * | 9/1983 | Geertsema et al. | 294/57 X |
| 4,691,954 A | | 9/1987 | Shaud | |
| 4,787,661 A | | 11/1988 | Rutledge | |
| 5,533,768 A | | 7/1996 | Mitchell | |
| 5,795,000 A | * | 8/1998 | Aldorasi | 294/57 |
| 5,951,078 A | * | 9/1999 | Whitehead et al. | 294/57 X |

FOREIGN PATENT DOCUMENTS

| | | | | |
|---|---|---|---|---|
| DE | 667608 | * | 11/1938 | 294/57 |
| GB | 122160 | * | 1/1919 | 294/57 |
| SE | 87623 | * | 10/1936 | 294/57 |

* cited by examiner

*Primary Examiner*—Johnny D. Cherry
(74) *Attorney, Agent, or Firm*—Woodard, Emhardt, Naughton, Moriarty & McNett

(57) ABSTRACT

A collapsible and telescopically constructed shovel. A scoop configured main body has a tubular member extending outwardly therefrom that slidably receives an elongated member of a handle. A latch pivotally mounted to the tubular member includes a pair of ridges extending into slots of the handle member and further includes a pair of hook shaped distal ends to secure the latch in either an erected or collapsed position.

17 Claims, 3 Drawing Sheets

COLLAPSIBLE SHOVEL

BACKGROUND OF THE INVENTION

1. Field of the Invention

This invention is in the field of shovels and more specifically, those shovels that may be collapsed to be stored.

2. Description of the Prior Art

Shovels include long handles thereby preventing the shovel to be conveniently stored in a small space. It has therefore been the practice to provide shovels having telescopically constructed handles. Three such telescopically constructed shovels are disclosed in the U.S. Pat. No. 4,691,954 issued to Shaud, U.S. Pat. No. 4,787,661 issued to Rutledge, and U.S. Pat. No. 5,533,768 issued to Mitchell.

Despite the prior shovels, there is still a need for a sturdy shovel having means for quickly locking and unlocking the shovel in both the collapsed and erected positions. The means for locking and unlocking the shovel should be contoured so as to not snag on clothing and other items. Disclosed herein is a shovel that meets the above requirements.

SUMMARY OF THE INVENTION

One embodiment of the present invention is a tool having an erected position and a collapsed position. The tool has a main body with an elongated first member extending therefrom, a handle with an elongated second member extending therefrom, and a pivotally mounted latch. The latch has an unlocked position allowing sliding motion between the first member and the second member and a locked position limiting sliding motion between the first member and the second member to lock the tool when erected and when collapsed.

It is an object of the present invention to provide a new and improved telescopically constructed shovel.

A further object of the present invention is to provide a tool, such as a shovel, that may be collapsed while providing a sturdy construction in the erected position.

An additional object of the present invention is to provide a collapsible shovel having means for quickly locking the shovel in both the erected and collapsed position.

Related objects and advantages of the present invention will be apparent from the following description.

DESCRIPTION OF THE PREFERRED EMBODIMENT

Figure 1:
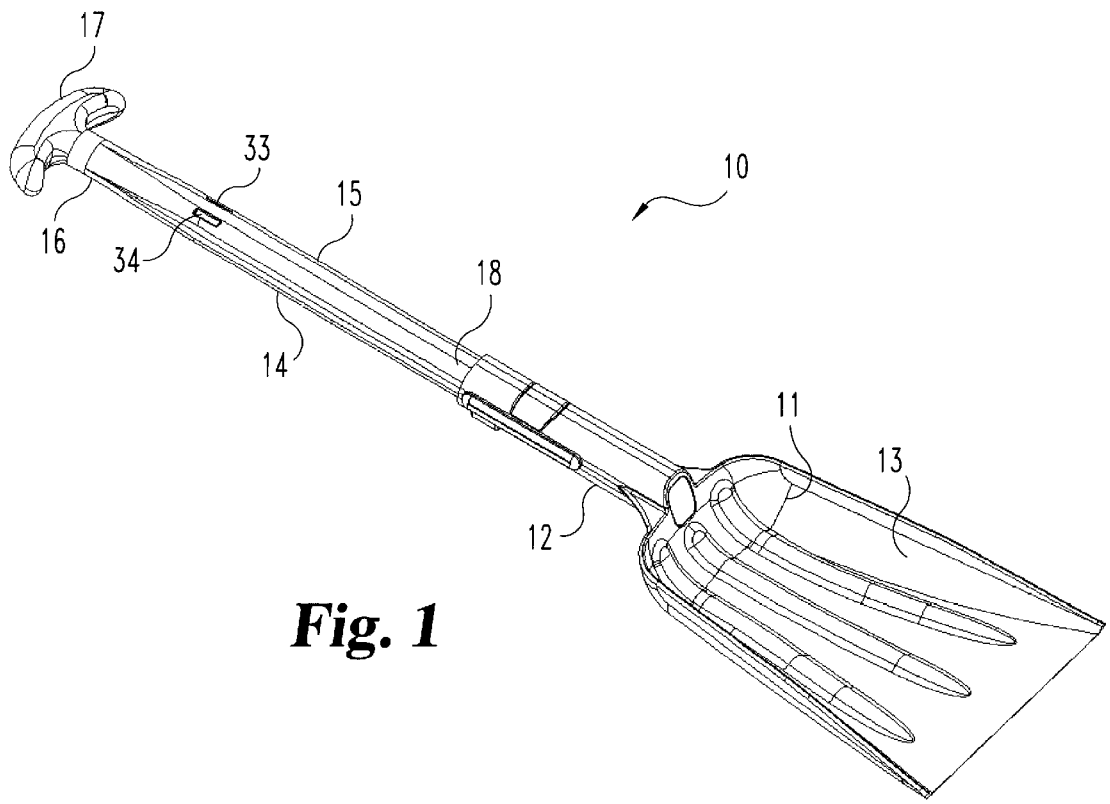
FIG. 1 is a front perspective view of a shovel incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a tool 10, such as a shovel, having a main body 11 composed of an elongated first member 12 connected to and extending outwardly from the scoop shaped portion 13 of main body 11. A handle 14 has an elongated second member 15 fixedly attached at the top end 16 to a handle grasping portion 17. The bottom end 18 of member 15 is slidably and telescopically connected to the first member 12 with member 15 extending into the hollow interior of member 12.

Figure 2:
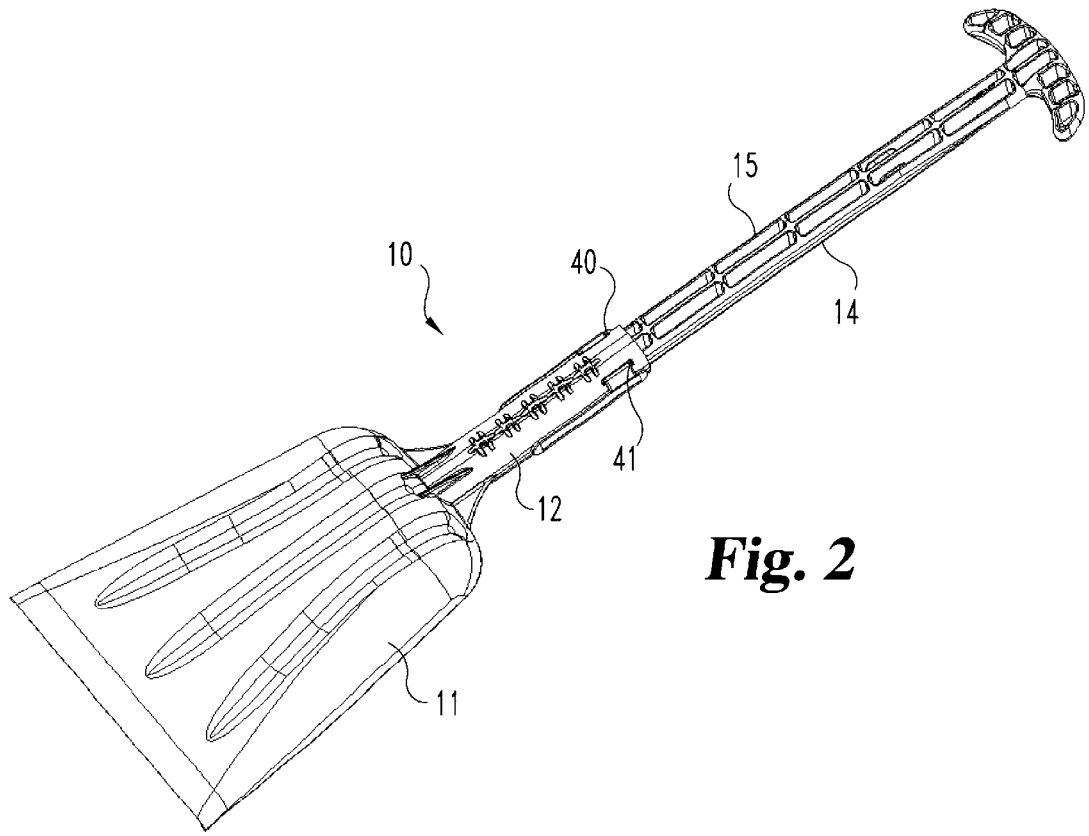
FIG. 2 is a rear perspective view.
Figure 3:
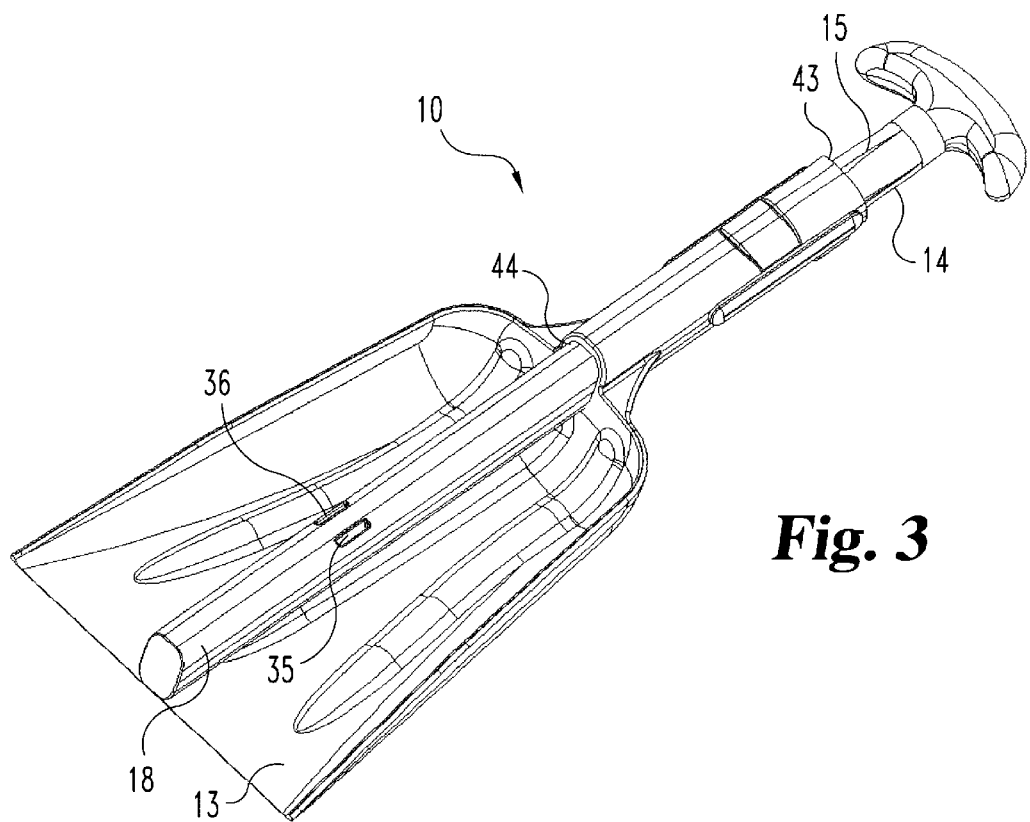
FIG. 3 is a front perspective view of the shovel shown in a collapsed position.

The shovel is depicted in FIGS. 1 and 2 in an extended position and in a collapsed position in FIG. 3. Handle 14 is slidable from the erect or extended position in FIG. 1 relative to tubular member 12 to a second or collapsed position as shown in FIG. 3 with the proximal end portion 18 of handle 14 being located adjacent the scoop shaped main body 13 of the shovel.

Figure 4:
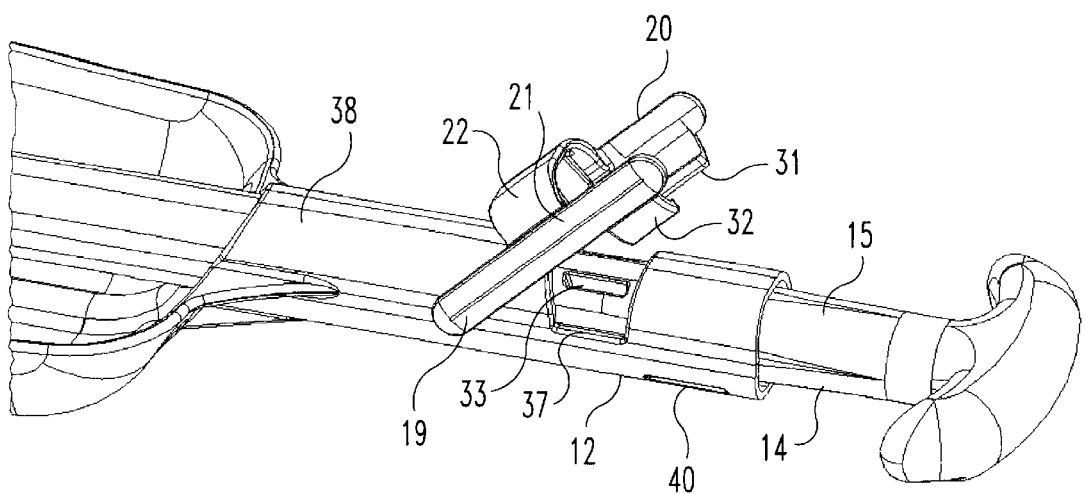
FIG. 4 is a perspective fragmentary view showing the latch in an unlocked position and the shovel in a collapsed position.

A latch 19 is pivotally mounted to member 12 and has an unlocked position as shown in FIG. 4 allowing sliding motion between members 12 and 15 and a locked position shown in FIGS. 1 and 3 limiting sliding motion between members 12 and 15 when the shovel is respectively in the collapsed position and erected position.

Figure 5:
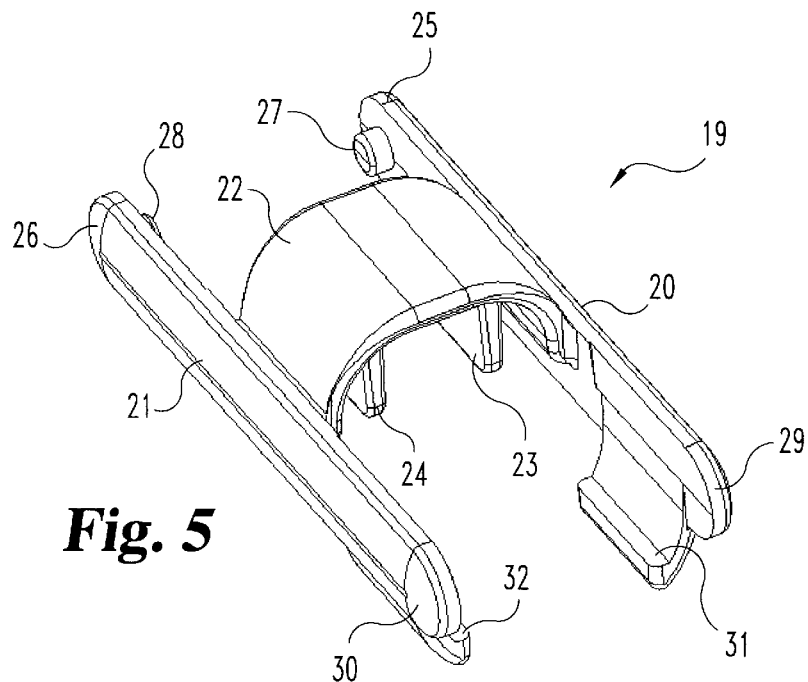
FIG. 5 is a perspective view of the latch.
Figure 6:
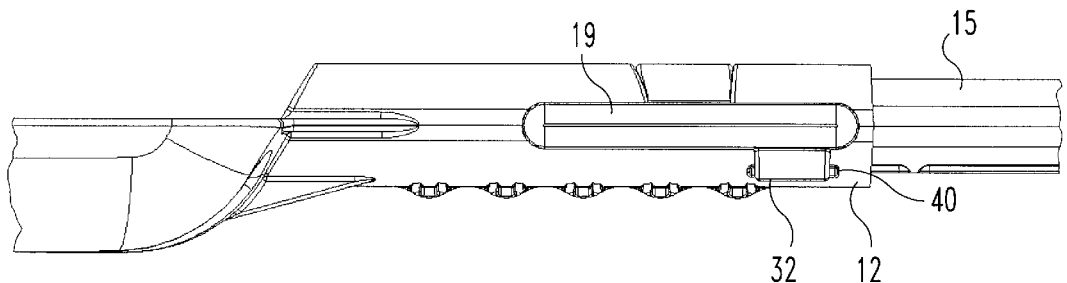
FIG. 6 is a fragmentary side view of the shovel with the latch shown in the locked position.

Latch 19 (FIG. 5) has a pair of parallel side rails 20 and 21 spaced apart but joined together by a band 22. A pair of ridges 23 and 24 are joined to band 22 and extend inwardly toward the shovel. The proximal ends 25 and 26 of side rails 20 and 21 are pivotally mounted to member 12 by a pair of mounting knobs 27 and 28 rotatably received in complimentarily sized holes provided in member 12. The distal ends 29 and 30 of side rails 20 and 21 have a pair of cantilevered mounted hook shaped ends 31 and 32 that project toward the shovel.

Member 15 has a first pair of slots 33 and 34 (FIG. 1) located at the top end 16 of the handle and a second pair of slots 35 and 36 (FIG. 3) located at the proximal end 18 of the handle. Both pairs of slots 33–34 and 35–36 are located on the front side of the shovel, it being understood that the front side of the shovel is that side of the shovel that faces outwardly away from the person holding the shovel as the shovel is being used. Slots 33–36 are sized and configured to receive ridges 23 and 24 when the latch 19 is pivoted to the locked position as depicted in FIGS. 1 and 3. Member 12 (FIG. 4) has an opening 37 positioned on the front side 38 of the shovel allowing ridges 23 and 24 to project therethrough into either slots 34–33 or slots 36–35 depending on whether the shovel is erected or collapsed. Ridges 23 and 24 extend into slots 33–36 and into the interior of member 15 with sufficient distances to prevent relative motion between members 12 and 15 when the latch is locked in either the position of FIG. 1 or FIG. 3. Band 22 is sized to fit within opening 37 with side rails 20 and 21 located on the opposite sides of member 12 providing a streamline contour when locked.

A third pair of slots 40 and 41 are provided on member 12 and are located on the back side of the shovel. Slots 40 and 41 (FIG. 2) are sized and configured to lockingly receive the pair of hook shaped distal ends 32 and 31 (FIG. 4) when the latch is snapped to the closed and locked position of FIGS. 2 and 3. The side rails 20 and 21 along with the hook shaped ends 31 and 32 are produced from an elastic material, such as plastic, allowing the hook shaped ends 31 and 32 to be biased outwardly by member 12 as the latch is moved to the closed or locked position with ends 32 and 31 then snapping into slots 40 and 41. Thus, when the latch is in the locked position, the hook shaped ends are located on the back side of the shovel extending into the third pair of slots 40 and 41 whereas the ridges 23 and 24 extend into the first or second pair of slots 33 through 36 located on the front side of the shovel providing a sturdy connection between members 12 and 15.

In order to unlock the latch, side rails 20 and 21 are pivoted from the position shown in FIG. 3 to the position shown in FIG. 4 with hook shaped ends 32 and 31 being forced elastically outward of slots 40 and 41 and with the ridges moving from the slots on member 15 allowing member 15 to then be moved to the appropriate position relative to member 12.

Member 12 has a tubular shaped configuration with a first open end 43 (FIG. 3) and an opposite second open end 44. When the shovel is in the erected position, member 15 extends through opening 43 but not opening 44 whereas in the collapsed position, (FIG. 3) member 15 extends through opening 44 locating the proximal end 18 of the handle in front of and adjacent the scoop shaped portion 13 of the shovel. The internal cross-section of the tubular shape member 12 may be oblong with member 15 having the same external cross-section to limit rotation of member 15 relative to member 12 and to automatically position slots 33–36 in line with opening 37. Band 22 may have a semi-cylindrical configuration to complementarily fit into opening 37.

Many variations are contemplated and included in the present invention. In order to provide the telescopic construction as depicted in FIG. 4, the present invention also includes configuring member 15 as a hollow tube into which member 12 slides with latch 19 then being mounted to member 15 and slots 31 through 36 being provided on member 12. Further, the drawings illustrate the invention in a configuration of a shovel although other types of tools may be provided with the subject invention.

The distal shaped ends 31 and 32 are lockingly engageable with slots 41 and 40 and are operable to hold ridges 23 and 24 in slots 34–33 or 36–35. By pivoting latch 19 to the closed or locked position, the latch is moved adjacent to both members 12 and 15 when the shovel is in both the erected position and collapsed position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tool having an erected position and a collapsed position comprising:
   a main body having an elongated first member extending therefrom;
   a handle having an elongated second member extending therefrom, said first member and said second member slidably and telescopically connected together, said second member slidable to a first position relative to said first member whereat said tool is erected and slidable to a second position relative to said first member whereat said tool is collapsed; and,
   a pivotally mounted latch having an unlocked position allowing sliding motion between said first member and said second member and a locked position limiting sliding motion between said first member and said second member to lock said tool when erected and when collapsed; and wherein:
   said latch has a first projection to limit relative motion between said first member and said second member and a releasably lockable second projection to hold said first member and said second member together when said latch is in said locked position.

2. The tool of claim 1 wherein:
   said latch has a proximal end pivotally mounted to said first member, said second member has a first slot and a second slot with said first projection movable into said first slot when said latch is pivoted against said first member and said second member when the tool is erected and further with said first projection movable into said second slot when said latch is pivoted against said first member and said second member when the tool is collapsed.

3. The tool of claim 1 wherein:
   said latch is pivotally mounted to said first member and has a distal end with said second projection on said distal end, said second projection contacts said first member and holds said latch there against when in said locked position.

4. The tool of claim 3 wherein:
   said second member has a first slot and a second slot with said first projection movable into said first slot when said latch is pivoted adjacent said first member and said second member when the tool is erected and into said second slot when said latch is pivoted adjacent said first member and said second member when the tool is collapsed.

5. The tool of claim 4 wherein:
   said first member has a tubular shaped configuration with a first open end and a second open end with said second member extending through said first open end and into said first member, said second member extending through said second open end when collapsed.

6. The tool of claim 5 wherein:
   said latch has a semi-cylindrical configuration with a proximal end and a pair of hooked shaped distal ends, said latch further has a plurality of ridges located between said proximal end and said distal ends, said second member has a plurality of first slots and a plurality of second slots, said first member includes an opening aligned with said first slots when the tool is erected with said ridges extending through said opening into said first slots, said opening is aligned with said second slots when the tool is collapsed with the ridges extending through said opening into said second slots.

7. The tool of claim 6 wherein:
   said first member includes third slots lockingly engaged by said hooked shaped distal ends when in the locked position.

8. The tool of claim 7 wherein:
   said first member and said second member have a back side and a front side, said first slots and said second slots open on said front side and said third slots are on said back side.

9. The tool of claim 8 wherein:
   said latch includes a band with said ridges projecting therefrom, said band extends into said opening when said ridges are in said first slots and when in said second slots.

10. A shovel having an erected position and a collapsed position comprising:

a main body configured as a scoop having an elongated first member extending therefrom;

a handle having an elongated second member extending therefrom, said first member and said second member slidably and telescopically connected together, said second member slidable to a first position relative to said first member whereat said shovel is erected and slidable to a second position relative to said first member whereat said shovel is collapsed; and, a pivotally mounted latch with a first projection and having an unlocked position allowing sliding motion between said first member and said second member and a locked position limiting sliding motion between said first member and said second member to lock said shovel when erected and when collapsed, said latch has a proximal end pivotally mounted to said first member, said second member has a first slot and a second slot with said first projection movable into said first slot when said latch is pivoted against said first member and said second member when the shovel is erected and further with said first projection movable into said second slot when said latch is pivoted against said first member and said second member when the shovel is collapsed; and wherein said first member has a tubular shaped configuration with a first open end and a second open end with said second member extending through said first open end and into said first member, said second member extending through said second open end when collapsed;

said latch has a semi-cylindrical configuration and a pair of hooked shaped distal ends, said latch further has a plurality of ridges located between said proximal end and said distal ends, said second member has a plurality of first slots and a plurality of second slots, said first member includes an opening aligned with said first slots when the shovel is erected with said ridges extending through said opening into said first slots, said opening is aligned with said second slots when the shovel is collapsed with the ridges extending through said opening into said second slots, said first member and said second member have a back side and a front sides said first slots and said second slots open on said front side and said hooked shaped distal ends are located on said back side when locked.

11. A shovel having an erected position and a collapsed position comprising:

a scoop configured main body with a top end;

a handle with an elongated member slidably mounted to said top end, said member including a top slot and a bottom slot formed thereon; and, a lock pivotally mounted to said top end of said main body, said lock including a projection movable into said top slot when the shovel is in a collapsed position and into said bottom slot when the shovel is in an erected position, said lock including a proximal end pivotally mounted to said top end and a hook shaped distal end lockingly engaged with said top end to hold said projection in said top slot when in said collapsed position and in said bottom slot when in said erected position.

12. The shovel of claim 11 wherein:

said lock includes a pair of spaced apart side rails and a band connected thereto which extends therebetween, said projection extends from said band.

13. The shovel of claim 12 wherein:

said member extends adjacent said scoop configured main body when in said collapsed position.

14. The shovel of claim 13 wherein:

said top end has an opening aligned with said top slot when in said collapsed position and aligned with said bottom slot when in said erected position, said band fitting into said opening when said lock is locked.

15. The shovel of claim 14, wherein:

said top end has an elongated arm into which said elongated member extends, said arm located between said spaced apart side rails when said projection extends into said top slot and when said projection extends into said bottom slot.

16. A tool having an erected position and a collapsed position comprising:

a main body having an elongated first member extending therefrom;

a handle having an elongated second member extending therefrom, said first member and said second member slidably and telescopically connected together, said second member slidable to a first position relative to said first member whereat said tool is erected and slidable to a second position relative to said first member whereat said tool is collapsed; and, a latch having an unlocked position allowing sliding motion between said first member and said second member and a locked position limiting sliding motion between said first member and said second member to lock said tool when erected and when collapsed; and wherein:

said latch has a first projection to limit relative motion between said first member and said second member and a releasably lockable second projection to hold said first member and said second member together when said latch is in said locked position.

17. A shovel having an erected position and a collapsed position comprising:

a scoop configured main body with a top end;

a handle with an elongated member slidably mounted to said top end, said member including a top slot and a bottom slot formed thereon; and, a lock mounted to said top end of said main body, said lock including a projection movable into said top slot when the shovel is in a collapsed position and into said bottom slot when the shovel is in an erected position, said lock including a proximal end mounted to said top end and a hook shaped distal end lockingly engaged with said top end to hold said projection in said top slot when in said collapsed position and in said bottom slot when in said erected position.

* * * * *